United States Patent [19]
Shah

[11] Patent Number: 5,231,248
[45] Date of Patent: Jul. 27, 1993

[54] STERILIZABLE CABLE ASSEMBLIES

[75] Inventor: Dinesh Shah, Chandler, Ariz.

[73] Assignee: W. L. Gore & Associates, Inc., Newark, Del.

[21] Appl. No.: 731,590

[22] Filed: Jul. 17, 1991

[51] Int. Cl.$^5$ .................................... H02G 15/02
[52] U.S. Cl. .................... 174/76; 174/74 R; 174/84 R
[58] Field of Search .......... 174/74 R, 74 A, 76, 174/80, 84 R, 88 R, 21 R, 21 JS

[56] References Cited

U.S. PATENT DOCUMENTS

| | | | |
|---|---|---|---|
| 3,609,217 | 9/1971 | Gaja | 174/120 SR |
| 3,660,592 | 5/1972 | Anderson | 174/114 R |
| 3,744,128 | 7/1973 | Fisher | 439/936 |
| 4,341,205 | 7/1982 | Hosono et al. | 128/6 |
| 4,433,206 | 2/1984 | Lewis | 174/76 X |
| 4,599,487 | 7/1986 | Blank et al. | 174/76 X |
| 4,626,721 | 12/1986 | Ouchi | 174/76 X |
| 4,963,699 | 10/1990 | Urushibata et al. | 174/88 R |
| 5,006,286 | 4/1991 | Dery et al. | 174/76 X |

FOREIGN PATENT DOCUMENTS 1269061  3/1972  United Kingdom .................. 174/76

OTHER PUBLICATIONS

Silicones for Medical Use, Silastic 07-4840; Dow Corning; No Date.
Emerson & Cuming, "Eccobond 45"; Technical Bulletin 3-2-3; No Date.
Chemlock PB10-2015C; Lord Elastomer Products Jan. 1985.
Fluoroelastomers of Daikin Industries; Daikin Industries, Ltd.; Jun. 1988.

*Primary Examiner*—Morris H. Nimmo
*Attorney, Agent, or Firm*—Gary A. Samuels

[57] ABSTRACT

A steam sterilizable and liquid sterilizable cable assembly comprising an electrical cable and a connector at either end, one connector adapted to connect to a measuring device and the other to a recording device, in which the exposed wires of the cable ends and the exposed leads in the connector are embedded in epoxy resin which seals the leads and wires from contact with steam or liquid, and if either the primary insulation or the jacket of the electrical cable is impervious to steam and sterilizing liquid.

4 Claims, 2 Drawing Sheets

STERILIZABLE CABLE ASSEMBLIES

FIELD OF THE INVENTION

This invention relates to an electrical assembly for use in the field of endoscopy. More specifically, it relates to such an assembly that can be sterilized for reuse by either steam or liquid sterilization.

BACKGROUND OF THE INVENTION

Medical assemblies which transmit electrical or optical signals from within the body to an external source are of increasing importance. These assemblies are made of cables which carry a signal by means of one or more conductive wires or fibers within the cable.

To one end of the cable, the distal end, is attached a sensing device that is adapted to sense a particular internal body condition. The sensing device can be a camera, a thermocouple, a pressure transducer, or the like. This end of the cable assembly is inserted into the body.

The other end of the cable, the proximal end, is external to the body and is connected to a unit that measures or records the signal input from the sensing device.

These cables must meet several key requirements. First, they must be flexible so that they can be anchored to the signal sensing unit and be easily manipulated to reach various parts of the body. The cable jacketing or covering must also be tough, i.e., cut and abrasion resistant, to protect the conductive wires and fibers.

The medical assemblies must also be sterilized for re-use. Sterilization may be accomplished by exposure to high temperature water vapor (steam) or specific organic liquids. It is very advantageous if the medical assemblies can be sterilized in either a steam autoclave or in a sterilizing organic liquid. An example of a sterilizing organic liquid is glutaraldehyde.

Presently, there are no such known medical assemblies which can be sterilized in both steam and sterilizing organic liquids.

SUMMARY OF THE INVENTION

It has now been discovered that a steam sterilizable and liquid sterilizable cable assembly comprising an electrical cable and a connector at either end, one said connector adapted to connect to a measuring device and the other to a recording device, can be obtained if the exposed wires of the cable ends and the exposed leads in the connector are embedded in epoxy resin which seals said leads and wires from contact with steam or liquid, and if either the primary insulation or the jacket of the electrical cable is impervious to steam and sterilizing liquid.

In one embodiment, a relief strain boot covers the epoxy embedded elements of at least one said conductor and extends partially along the outside of said electrical cable and forms a seal with the outside of the cable. Preferably the boot and the outside of the cable are made of the same material. Preferably, also the electrical cable has its outer jacket made of silicone rubber or a fluoroelastomer.

In another embodiment, at least one of the connectors comprises a metal housing open at each end with the leads of the connector contacting the wires of the cable at a contact point inside the housing and the epoxy resin fills the interior of the housing, wherein a relief strain boot covers a portion of the metal housing and a portion of said electrical cable, and wherein the metal housing and the boot are adhered to one another by an epoxy primer adhesive that prevents liquid or steam from entering the cable and is applied to form a liquid and steam resistant seal.

DETAILED DESCRIPTION OF THE INVENTION

Figure 1:
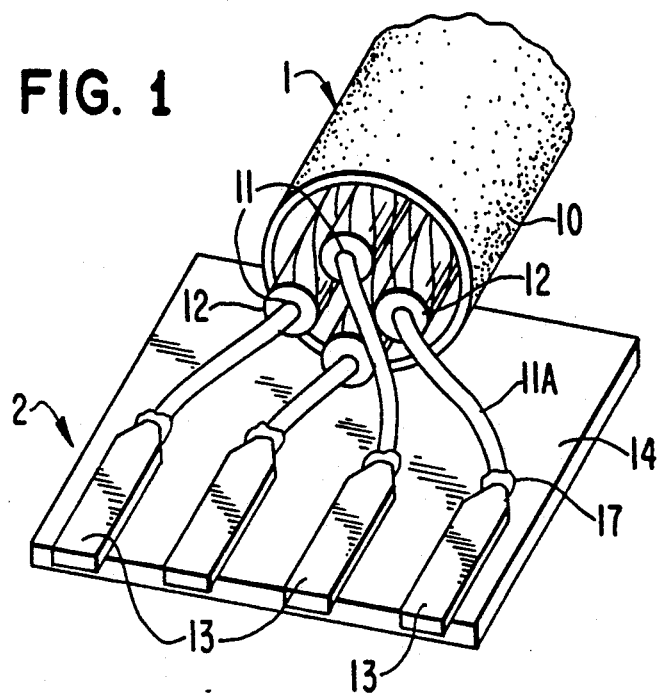
FIG. 1 depicts one embodiment of the assembly of the invention and shows the wiring configuration of one type of connector where the connector is a printed circuit board.
Figure 2:
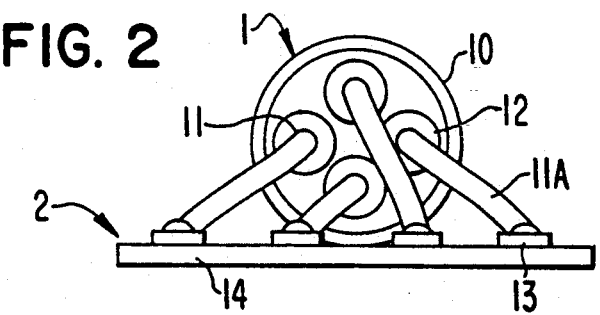
FIG. 2 shows the assembly of FIG. 1 from an end view.

Referring to the drawings, FIGS. 1 and 2 depict views of electrical connector terminated to a cable. In these figures, the electrical cable 1 is connected to connector 2, which in this embodiment is a printed circuit board. The cable 1 comprises jacket 10 inside of which are electrical conductor wires 11 surrounded by primary insulation 12. Each conductive wire 11 is soldered at 17, for example, to conductive PCB leads 13. Leads 13 are attached to base plate 14 of the PCB. The cable wires are protected from steam and liquid attack by making the cable jacket 10 out of a steam and liquid impervious material, such as a thermoplastic elastomer having fluorocarbon soft and hard segments, or by making the jacket 10 out of a silicone resin and using full density polytetrafluoroethylene as the primary insulation.

Figure 3:
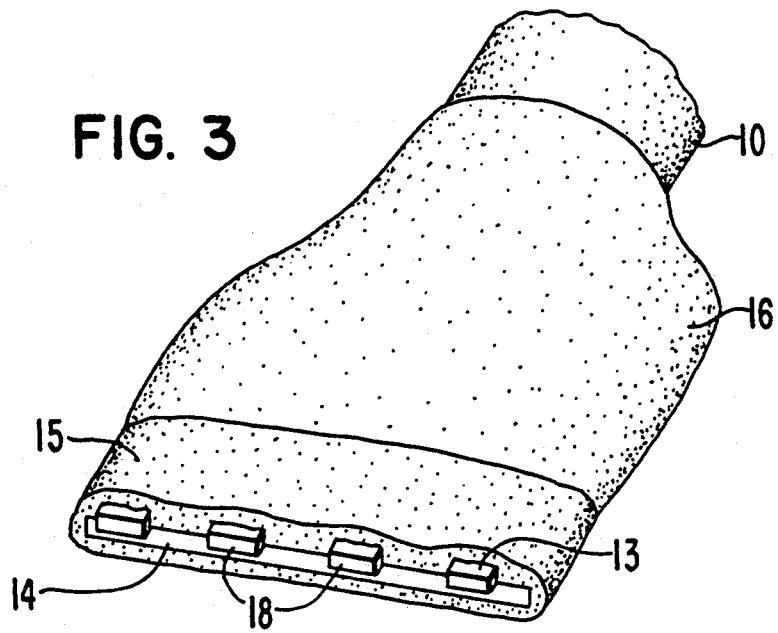
FIG. 3 shows the assembly of FIG. 1 covered with a protective epoxy sealant and cut-away boot.

Referring now to FIG. 3, to protect exposed cable wires 11A, soldered contacts 17 and leads 13 from steam and sterilizing liquids, all of the exposed wires, contacts and leads, except for a small portion 18 of the leads to which a recording device can attach, are embedded in epoxy resin sealant 15. The epoxy sealant is applied by molding the epoxy resin in place around the desired portion of the assembly. Conveniently, a cavity mold can be used.

In FIG. 3, the protective epoxy sealant 15 has been applied to cover the entire connection, leaving exposed only the ends of conductive elements 13. The epoxy resin forms a seal which prevents either steam or liquid disinfectant from attacking the cable wiring or the connections between the cable and the PCB. A relief strain boot 16 completes the assembly.

The boot 16 and cable jacketing 10 are made of a material that can withstand both moisture at high temperatures, such as steam, and liquid disinfectants. Such materials include steam and sterilizing liquid impervious silicone elastomers or fluoroelastomers such as 3M's Fluorel ® elastomers, duPont's Viton ® fluoroelastomers or Daikin's Daiel ® fluoroelastomers.

Preferably, the boot 16 and the cable outer jacket 10 are made of the same material and where the boot overlies the jacket the two are bonded to effect a steam and liquid seal at that point.

Thus, the jacketing should be a flexible material that is tough, cut-resistant, steam resistant and sterilizing liquid resistant.

Figure 4:
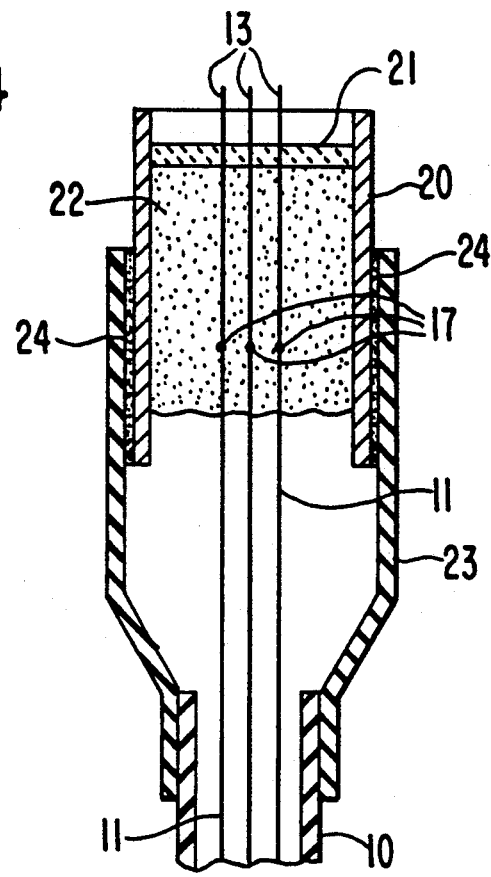
FIG. 4 shows another embodiment of the assembly and shows the wiring configuration of a type of connector where the connector has a metal housing.

FIG. 4 depicts another type of connector attached to cable 10. In this embodiment, metal housing 20 surrounds leads 13, solder points 17 and cable wires 11. Glass frit 21 seals off the interior of the metal housing from the outside. The entire interior of housing 20 is filled with epoxy resin 22 to seal off the leads and exposed cable wires from attack by steam or sterilizing liquids. A strain relief boot 23 further protects the cable wires and leads. Steam and sterilizing liquids are prevented from entering between housing 20 and boot 23 by using an adhesive 24, preferably an epoxy primer.

Figure 5:
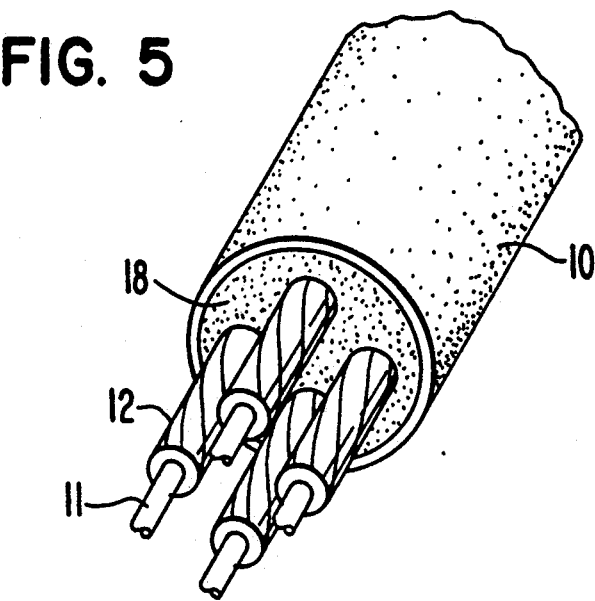
FIG. 5 is a cutaway view of one end of the cable of the assembly.

FIG. 5 is a cutaway view of one type of cable of the assembly. It is, of course, not critical what sequence the insulation and conductive wires take in this invention. That will, of course, vary depending on the intended function of the assembly. In the particular cable shown, conductive wire 10 is wrapped with primary insulative tape 12 and then insulation 18 can be extruded around all the wires, or wrapped around (not shown). Protective jacket 10 surrounds the entire construction. Conductive or metallic shielding can form one layer of the cable construction (not shown here).

If the jacket is made of a steam and sterilizing liquid impervious fluoroelastomer, nothing more need be done to protect the conductive wire. If, however, the jacket is a silicone, it is impervious to sterilizing liquid; but to prevent steam from attacking the conductive wires, the primary insulation used around each wire should be one that is impervious to steam. An example of such an insulation is full density polytetrafluoroethylene. The epoxy resin used to embed and surround the connector leads and the cable conductive wires can be any liquid impervious epoxy resin. One such resin is Eccobond 45 clear, obtainable from Emerson and Cuming, Inc. of Woburn, MA.

The epoxy adhesive primer used in one embodiment of the invention can be any liquid-impervious adhesive. Such adhesives include Chemlok 213 or 218 obtainable from Lord Chemical Products of Erie, PA.

As mentioned previously, the fluoroelastomer used in the cable jacketing is one that is impervious to steam and sterilizing liquids. Preferably, it is a thermoplastic fluoroelastomer. Preferably, it contains hard segments comprising ethylene/tetrafluoroethylene (E/TFE) copolymer units, or vinylidene fluoride (VF$_2$) units or crystalline vinylidene fluoride copolymer units; and soft segments comprising noncrystalline vinylidene fluoride copolymers such as VF$_2$/hexafluoropropylene (HFE) units, or VF$_2$/HFP/TFE copolymer units. One fluoroelastomer, made of soft segments of hexafluoropropylene/vinylidene fluoride copolymer units and hard segments of ethylene/tetrafluoroethylene units, is available as Daiel ® fluoroelastomer from Daikin KKK. Specifically, one is Daiel 530 fluoroelastomer.

The silicone elastomers used as cable jacketing generally have the recurring formula

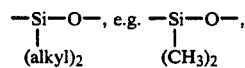

An example is Dow Cornings "Silastic" 07-4750 elastomer having an uncured viscosity of about 700 cps at 25° C.

The cable assemblies can be used for a wide variety of purposes. The distal end can be attached to a camera or thermocouple, or the like to sense internal body conditions. It can also be attached to surgical devices such as a laser or the like.

Tests were carried out on cable assemblies described above. Cable assemblies of the invention were immersed in 3½% glutaraldehyde solutions (Cidex ® disinfectant available from Johnson and Johnson, Inc.) for 1 hour at ambient conditions. In other tests, cable assemblies were subjected to steam for 3 minutes at 132° C. (270° F.) at 28 psi. The assemblies were effectively sterilized with no effect on the internal electricals.

I claim:

1. A steam sterilizable and liquid sterilizable cable assembly comprising an electrical cable having a plurality of wires exposed at each end and a connector at either end, one said connector adapted to connect to a measuring device and the other connector adapted to connect to recording device, wherein the exposed wires of the cable ends and the leads in the connector are embedded in epoxy resin which seals said leaks and wires from contact with steam or liquid, and wherein the wires within the cable are protected from attack by steam or sterilizing liquid by full density polytetrafluoroethylene insulation and silicone rubber jacketing, that is impervious to steam and sterilizing liquid.

2. The cable assembly of claim 1 wherein at least one epoxy embedded moiety has a relief strain boot surrounding it which extends partially along the electrical cable and forms a seal with the jacket of the cable.

3. The cable assembly of claim 1 wherein the connector comprises a metal housing open at each end with leads of the connector contacting the wires of the cable at contact points located inside the housing, and wherein the epoxy resin fills the interior of the housing, and wherein a strain relief boot covers a portion of the metal housing and a portion of said electrical cable, and wherein the metal housing and the boot are adhered to one another by an epoxy primer adhesive that is applied to form a liquid and steam resistant seal to prevent steam or liquid from entering the cable interior.

4. A steam sterilizable and liquid sterilizable cable assembly comprising an electrical cable having a plurality of wires exposed at each end and an connector at either end, one said connector adapted to connect to a measuring device and the other connector adapted to connect to recording device, wherein the exposed wires of the cable ends and the leads in the connector are embedded in epoxy resin which seals said leads and wires from contact with steam or liquid, and wherein the wires within the cable are protected from attack by steam or sterilizing liquid by jacketing made of a thermoplastic fluoroelastomer that is impervious to steam and sterilizing liquid and is a block copolymer containing a hard segment of an ethylene/hexafluoropropylene copolymer or a vinylidene fluoride polymer or a crystalline vinylidene fluoride copolymer, and a soft segment of a copolymer of vinylidene fluoride and hexafluoropropylene, or a noncrystalline copolymer of vinylidene fluoride, hexafluoropropylene and tetrafluoroethylene.

* * * * *